July 10, 1962

A. B. MAGNUS, JR 3,043,104

FLUID PRESSURIZING SYSTEMS WITH LOW
TEMPERATURE RISE CHARACTERISTICS

Filed July 24, 1959

INVENTOR.
ALEXANDER B. MAGNUS, JR.
BY
ATTORNEY.

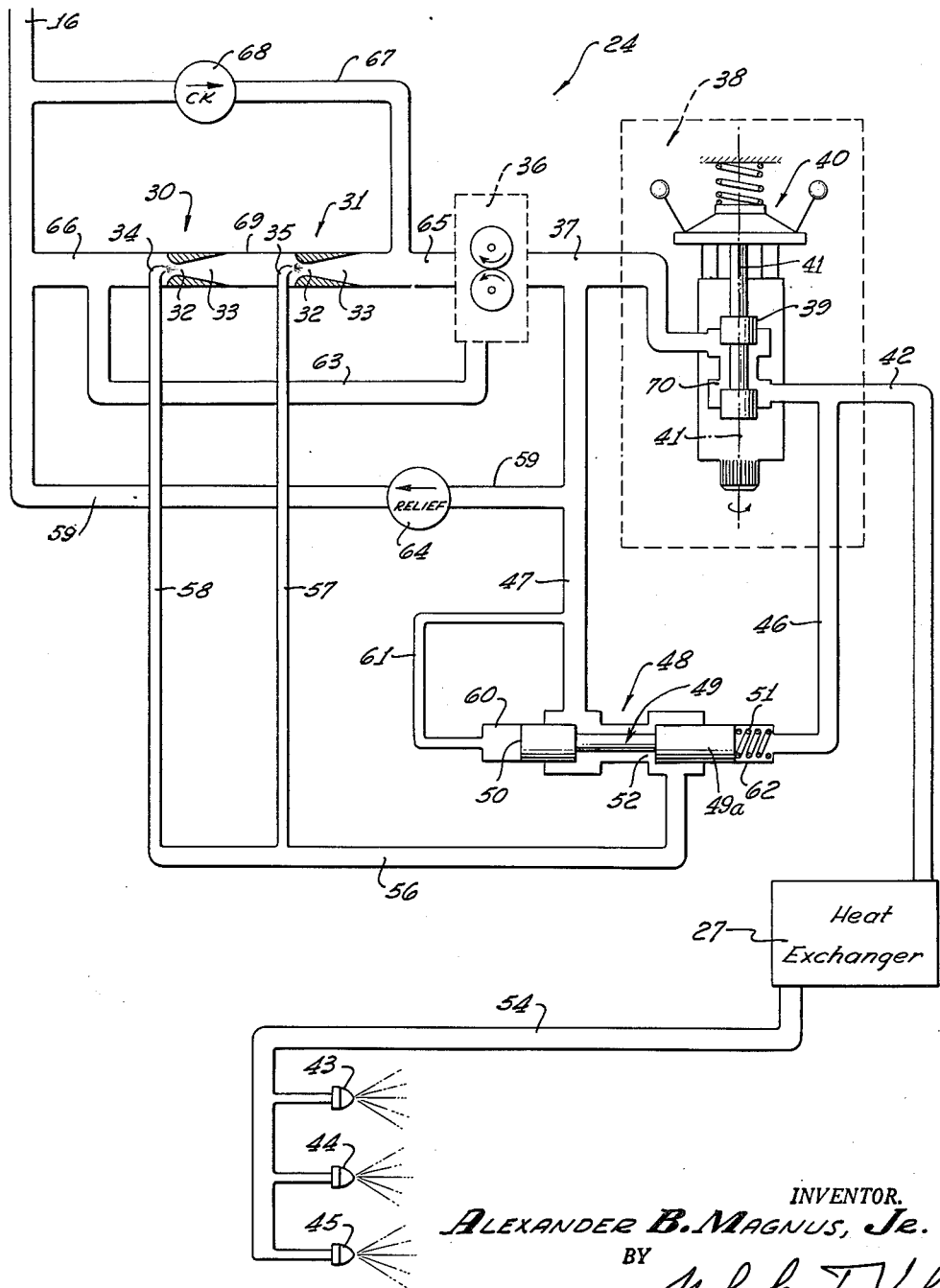

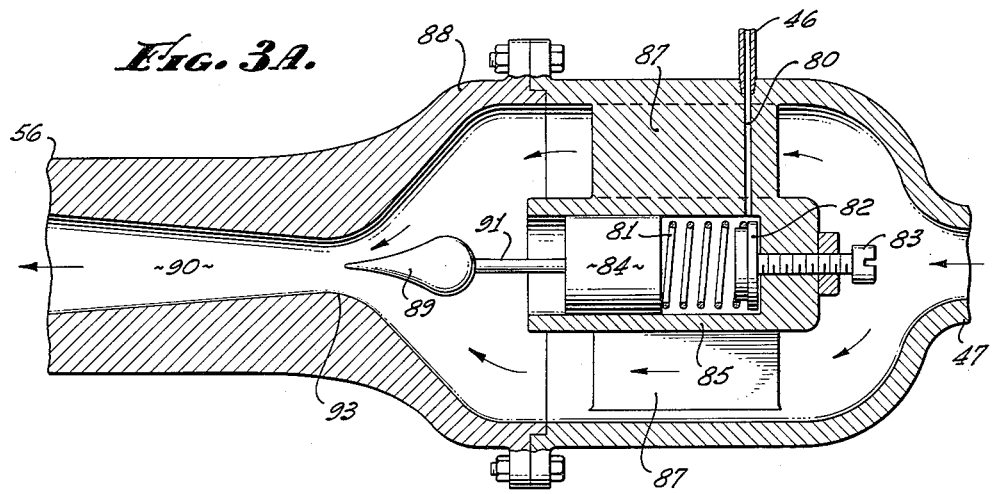
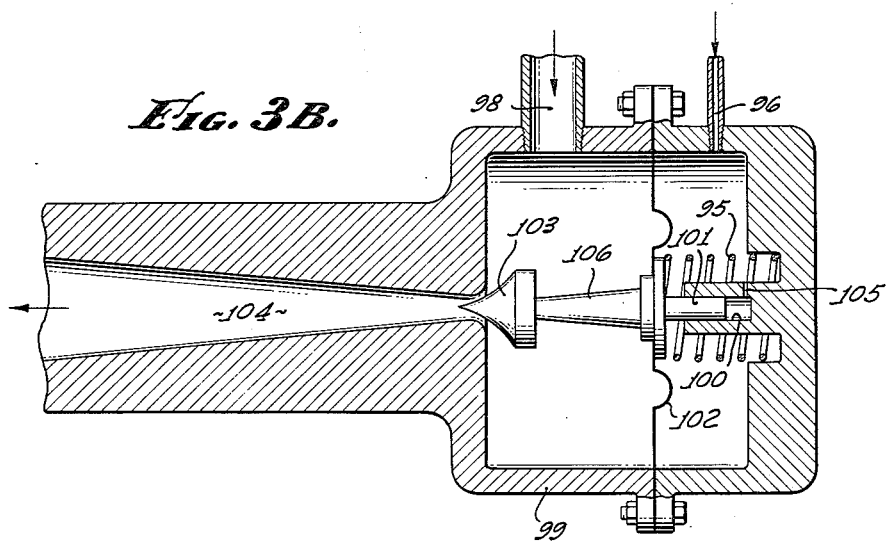

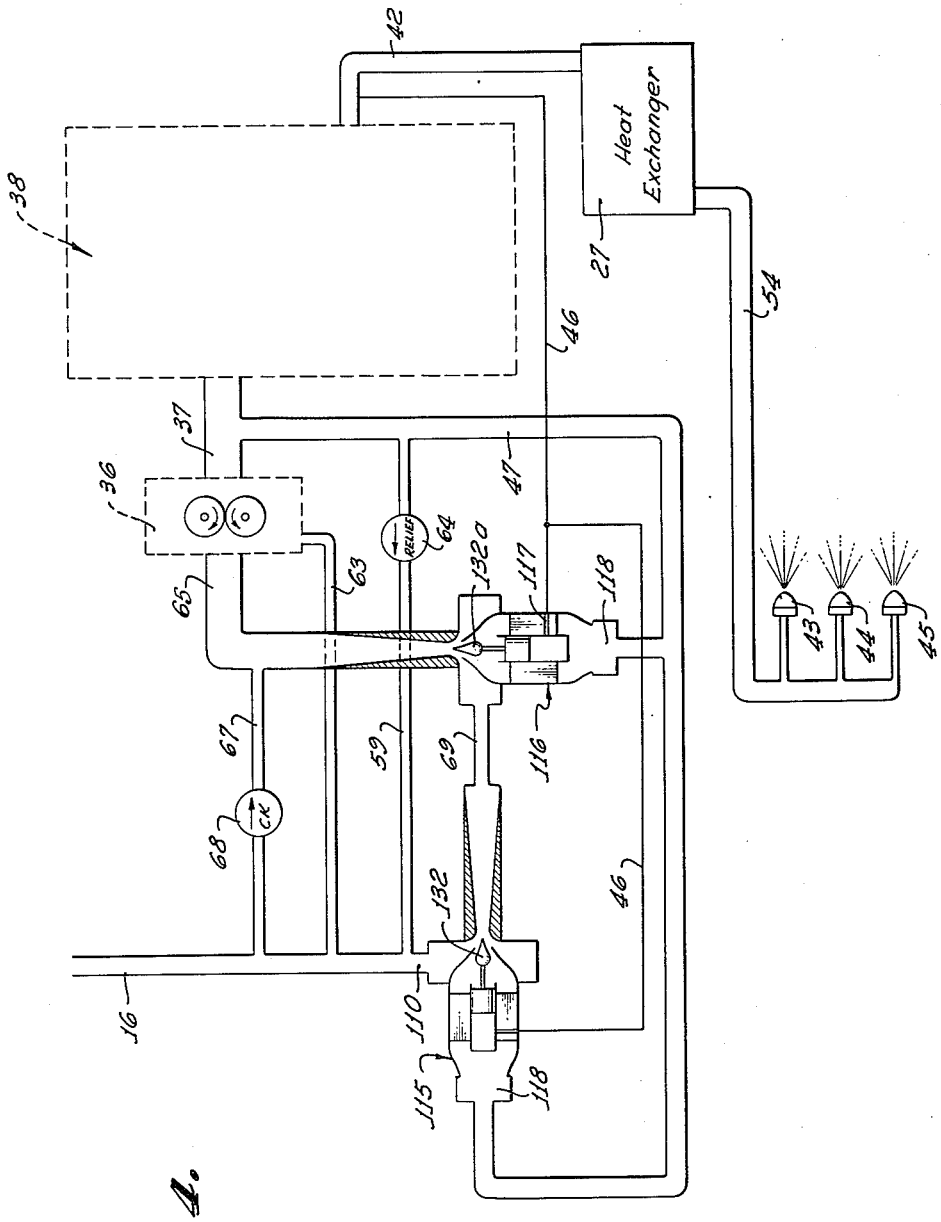

3,043,104
FLUID PRESSURIZING SYSTEMS WITH LOW TEMPERATURE RISE CHARACTERISTICS
Alexander B. Magnus, Jr., Los Angeles, Calif.
(415 N. Dunton Ave., Arlington Heights, Ill.)
Filed July 24, 1959, Ser. No. 829,372
11 Claims. (Cl. 60—39.28)

This invention relataes to fluid supply systems, and more particularly, to the methods and means for reducing the rise in the temperature of fuel on turbojet engines due to losses and throttling when fixed displacement pumps are used as a means for pressurizing the fuel. The principles and the methods for reducing the temperature rise of the fuel are also applicable to any fluid pumping systems using incompressible or compressible medium, where by-pass heating is a problem. This would include fluid systems in which the pump output cannot be conveniently modulated, but in which system demands may vary over wide limits—from zero to the full flow capability of the pump.

The systems will be illustrated and decribed in connection with jet engines, but it is to be understood that the teachings of this invention are also applicable to all liquid or gas pumping systems, such as hydraulic systems used in missiles, aircraft, machine tools, industrial and commercial tractors, power steering, etc., and fuel and propellant pressurization systems. In addition to the aircraft already mentioned, the disclosed systems are also applicable to variable thrust rockets, ram jets, turboprop engines, auxiliary power supplies, etc.

By-passing, or throttling, of high pressure fluid always results in heating of the fluid. Heating by recirculation occurs due to the fact that throttling is a process of zero thermodynamic efficiency. For most pumping systems, the pump is driven by a consant speed prime mover which means that pump output, irrespective of system demands, is essentially constant. As the pressurized liquid must go somewhere, it is by-passed back to the pump inlet, or system reservoir, as soon as the pump discharge pressure equals the predetermined setting of the high pressure relief valve. Such by-passing and recirculation of the fluid, at high pressure, heats the fluid, the pressure potential energy of the fluid being converted into heat energy in the course of throttling and flow through ducting. The temperature rise in the fluid due to this throttling and recirculation on high performance systems, having large pressure differentials may be in the order of 20° to 300° F. or more at zero or negligible system flow demands.

It may be shown that $\Delta T$, which is the fluid temperature rise due to throttling and recirculation around the pump, is a function of five parameters: (a) the pressure differential across the throttling valve; (b) the specific heat of the fluid; (c) the specific gravity of the fluid; (d) the pump efficiency; (e) the by-pass flow ratio, BR. $\Delta T$ is expressed by the following equation:

$$\Delta T = 2.97 \times 10^{-3} \frac{\Delta P}{\gamma C_p} \left\{ \frac{BR + 1 - \eta_p}{\eta_p} \right\} \quad (1)$$

where:

$\Delta T$ = The temperature rise —° F.
$\Delta P$ = Pressure drop across the throttle valve or pump pressure rise—p.s.i.
$\gamma$ = Specific gravity of the fluid
$C_p$ = Specific heat of the fluid—B.t.u./lb. ° F.
$\eta_p$ = Pump efficiency—percent
$BR$ = By-pass ratio—The ratio of by-pass flow to system flow Several devices and techniques have been evolved to reduce this heating. These methods have often introduced many secondary problems. Devices that may be listed are as follows: The accumulator, which accepts fluid and is charged during periods of low system demands and discharged during periods of peak system demands. Accumulators are costly and must be serviced regularly. Moreover, in aircraft applications, the accumulators are generally too bulky and add too much weight to be considered for such applications. Another device is the unloader valve used in conjunction with a reservoir. With the unloader valve, as soon as system pressure reaches a predetermined value, or setting, the unloader valve opens a port, directing the full pump flow back to the reservoir at reservoir pressure, while maintaining system and reservoir pressures at the desired values. When system pressure drops, the valve port to the system opens and the reservoir port closes, again directing pump flow to the system. The cost, maintenance, dynamic stability and high shock loads on various system components during "switching" of the unloader valve have been the severest disadvantages of this device. Additionally, there are some applications where the unloader valve is not suitable. A further solution to the bypassing problem has

TABLE 1

| Condition of Operation | T Ambient of— | Instantaneous Engine Fuel Flow— $W_{Eng}$ #/Hr. | Ratio of Instantaneous to Maximum Pump Flow $W_{Eng}/W_{pump_{max}}$ [1] | Pump Pressure Rise, p.s.i. | Temperature Rise $\Delta T$ in Fuel Systems, $\Delta T_{pump}$ in ° F. | | |
|---|---|---|---|---|---|---|---|
| | | | | | Fixed Displ. Pump System Rise | Jet System | Variable [2] Capacity Pump System |
| Sea Level: | | | | | | | |
| Idle | 100° F | 250 | 0.24 | 350 | | | |
| Take-Off | 60° F | 16,500 | 27.00 / 16.5 / 27.0 | 875 | 12.5 | 11.0 | 10.1 |
| Mach Number=1.0 | 60° F | 23,500 | 23.5 / 27.0 | 1,150 | 10.4 | 10.2 | 8.4 |
| 60,000 Ft.: | | | | | | | |
| Cruise | NACA Std. Day | 2,200 | 2.2 / 27.0 | 350 | 76.7 | 22.2 | 11.3 |
| Max. Speed | NACA Std. Day | 7,600 | 7.6 / 27.0 | 580 | 25.3 | 10.7 | 8.4 |

[1] Based on pump flow of 27,000 p.p.m. @ rated speed.
[2] Assumed minimum by-pass fuel flow of variable displacement pump is 800 p.p.m. for servo-controller.

been the use of the variable capacity pump, which, while relatively costly, is an ideal solution in that it can precisely adjust pump delivery to system demands, thereby completely eliminating by-passing. This latter solution also introduces considerable additional mechanical complexity and reduces the reliability of the system. Still another system employs a constant displacement pump which is driven by a variable speed transmission system. Transmissions of this type are costly, and generally lack the reliability required in aircraft applications.

Referring now to Table 1, it illustrates the magnitude of the fuel heating problem on one particular application.

Table 1 has the following column headings: "Condition of Operation," which indicates such conditions as Sea Level Idling, Take-Off, Flight at Mach Number=1.0 Cruising at 60,000 feet and Maximum Speed. The next column is T ambient, which is the ambient temperature. The next column is "Instantaneous Engine Fuel Flow," in pounds per hour, which is indicated by "W." The next column is "The Ratio of the Instantaneous Fuel Flow" at any given time divided by the maximum pump flow. The next column indicates ΔP across the pump, which is the rise in pressure, in p.s.i. produced by and appearing across the constant displacement pump. The next three columns indicate the temperature rises in the fuel when three different types of fuel pumping systems are used. The first system is the Fixed Displacement Pump System. The second system is the Venturi Pump System, disclosed in this application, and the third system is the Variable Capacity Pump System. Only the Fixed Displacement Pump System and the Variable Displacement Pump System are compared with the Venturi Pump System disclosed in this application because they are the only two systems that are currently in use in connection with aircraft. Examination of Table 1 reveals that the engine fuel flow, "W," may have a variation from 250 pounds per hour for the fuel flow during the idle condition of the engine at sea level, to 23,500 pounds per hour at high speed flying at sea level (Mach 1.0), or in excess of a 1:100 ratio. It should be noted that, in order to accommodate manufacturing variations in pump displacement, a suitable overcapacity factor is generaly introduced with the result that the maximum pump delivery may be larger, i.e., four to ten percent than that required for maximum engine operation, i.e. in the case shown 27,000 pounds per hour. Additionally, if some other requirement, such as maximum allowable engine start time, should become the pump design criteria, then pump delivery at rated speed could be larger by a factor of 50 to 75 percent, further increasing the by-pass ratio during high altitude cruise operation. The next column illustrates the pump pressure magnitude of the rise at various outputs. These pressures are the pressures that would be used as ΔP in the Equation 1 given previously. The most illustrative columns, and the columns of the greatest importance, are the next three succeeding columns which compare the calculated temperature rise of the fuel at the various operating conditions. The temperature rises are for the three different fuel supply systems: the first column is for the Fixed Displacement Pump System; the next column is for the Venturi Pump System disclosed in this application; and the last column is for the Variable Capacity Pump System. Examination of these three columns discloses that the Variable Capacity Pump System has the best performance characteristics from the point of view of the heat rise. However, as mentioned previously, this system introduces mechanical complexities and other problems although from a purely heat rise point of view, it is superior to the other two system considered. The Fixed Displacement Pump System, on the other hand, does have a high reliability, but as indicated in Table 1, the temperature rise of the fuel under certain conditions such as Cruise and Idle Descent (the latter not being shown in Table 1 is so high that such systems are at a disadvantage from thermal considerations.

A critical problem on high performance aircraft is the use of the fuel as a coolant. As an example on self-cooling jet engines some means must be provided for cooling the lubricating oil which is used for lubricating and cooling the bearings of the engine. The use of fuel as the coolant on aircraft is an accepted practice. Indeed, on high performance self-cooling jet engines the fuel flow to the engine may be said to represent the most convenient, if not the only, heat sink for the hot lubricating oil. Outside limits to the available fuel cooling capacity are established by fuel gumming and boiling temperature limitations in the engine nozzles, and by fuel tank outlet temperatures. It is seen that heat added to the fuel is dumped overboard with the combustion products at minimum penalties to the aircraft, and may actually tend to increase engine performance by raising the total energy content of the fuel. At relatively low Mach numbers, say, when the air a stagnation temperature of the order of 140° or 150°, it is possible to obtain cooling for the lubricating oil by means of heat rejection to the ambient air. However, at high Mach numbers, when the stagnation temperature may be in the order of 700° F., it is obvious that the ambient air cannot be used as a cooling medium for lubricating oil, which cannot have an operating temperature in excess of 400° F. Beyond hot spot temperatures of 450° F., decomposition and general impairment of the oil takes place with the concomitant deterioration of the lubricating system reliability. Accordingly, the only available heat sink for the lubricating oil at high Mach number is the fuel, and when this is the case, then the fuel supply systems must be arranged so as to reduce any rise in the fuel temperature to an absolute minimum. As indicated in Table 1, the disclosed Venturi Fuel System performs this task.

It is, therefore, an object of this invention to provide a fluid pressurization system in which the entire pressure potential energy of the by-passed fluid, is utilized in venturi pumps to convert the entire pressure potential energy into kinetic energy, and then recover this kinetic energy as pressure, thus reducing the work performed by the constant displacement pump, and also reducing fluid heating due to throttling and recirculation.

It is an additional object of this invention to provide a method and apparatus for fluid supply systems, in which heating of working fluid must be kept to an absolute minimum, such as fuel supply systems for high Mach number aircraft, in which heating of the fluid is minimized by shunting the entire excess amount of fluid back to the input side of a constant displacement pump with minimum amount of throttling and by replacing heat-generating throttling with the transformation of the potential energy contained in the excess fluid on the output side of the pump into the potential energy of the fluid on the input side of the pump with the aid of a venturi pump or pumps connected in series with the input into the constant displacement pump.

Yet another object of this invention is to provide a fluid system in which heating of the fluid is reduced by connecting one or more variable nozzle venturi pumps in series with a constant displacement pump, the nozzles of the venturi pumps being operated by and receiving the entire excess fluid appearing on the output side of the constant displacement pump, and the degree of opening of the nozzles being controlled by the fluid pressure on the downstream, or output side, of the system.

The novel features which are believed to be characteristic of this invention, both as to its organization and method of operation, together with further objects and advantages thereof, will be better understood from the following description given in connection with the accompanying drawings in which several embodiments of the invention are illustrated by way of several examples. It is to be expressly understood, however, that the drawings are for the purpose of illustration only and are not intended as a definition of the limits of the invention.

Referring to the drawings:

FIGURE 2 is a schematic diagram of the first version of the fuel supply system utilizing two fixed area venturi pumps connected in series.

FIGURE 3A is a cross-sectional view of a variable area by-pass valve of a lapped slide-cylinder design.

FIGURE 3B is a cross-sectional side-view of a variable area pintle valve of the diaphragm type wherein a flexible diaphragm is used as a flexible wall between two signal pressures.

FIGURE 4 is another version of a schematic diagram of a fuel system utilizing two variable area venturi pumps connected in series with the constant displacement pump and control connections for such system.

The invention will be described in connection with jet aircraft fuel supply systems in which fuel is supplied at an essentially fixed volume flow rate by means of a constant displacement pump, and any excess of fluid is returned back to the input side of the fixed displacement pump by means of a venturi pump or several venturi pump units connected in series. Thus all of the pressure potential energy of the entire excess fluid, appearing on the output side of the fixed displacement pump, is partially converted into pressure potential energy of the fluid on the input side of the fixed displacement pump by means of the venturi pump units. Such by-passing of the entire excess fluid through the venturi pumps minimizes heating of the fluid.

Figure 1:
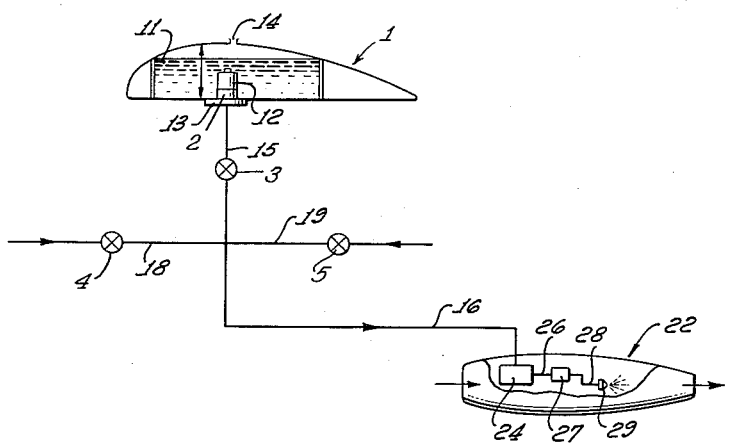
FIGURE 1 is a schematic diagram illustrating an application of the disclosed system to a jet engine.

Referring to FIGURE 1, it illustrates a transverse sectional view of an airfoil, or a wing 1, of an aircraft with a fuel tank 11 positioned within the airfoil. The fuel tank is provided with a submerged booster pump 12 and a filter 2 which are mounted on a flange 13. The tank is provided with a vent 14 which connects the tank to ambient air. The booster pump 12 is mounted within the tank and it is used for pressurizing fuel, and any vapor as well as air that may be entrained or absorbed in the fuel. The booster pump also pressurizes the fuel to prevent boiling and cavitation effects at the main pump. Because of small thickness of the high Mach number airfoils, a relatively large number of individual tanks is distributed through the length of the airfoil and these tanks are interconnected with the main fuel supply line 16 by means of a plurality of lines, such as lines 15, 18 and 19. These individual fuel lines are controlled by suitable shut-off valves 3, 4 and 5. The main fuel duct 16 is connected to a jet engine 22 and more particularly to the schematically indicated unit 24 which includes venturi pump units, a constant displacement fuel pump, a master fuel controller, and several control valves. The schematic diagram of these members is illustrated more in detail in FIGURE 2. Unit 24 is connected to an outgoing fuel duct 26 which, in turn, is connected to the oil-fuel heat exchanger 27. The high temperature side of the heat exchanger is connected to the lubricating oil system. The heat exchanger 27, therefore, is used for cooling the engine lubricating oil with the engine fuel thus acting as a heat sink. Discharge fuel from the heat exchanger enters duct 28 which is connected to the fuel nozzles 29 located in the combustion chambers.

Referring now to FIGURE 2, a schematic diagram of the master fuel controller 38, shown as part of unit 24 of FIGURE 1 and its associated apparatus, all located at the engine nacelle, 22, duct 16, also shown in FIGURE 1, is connected to two venturi pump units 30 and 31 series connected by duct 69. The venturi pumps include a tapered inlet and throat section 32 and a diffuser section 33 identical in function, if not in size, in the two venturi pump units 30 and 31. The venturi pump nozzles 34 and 35 are connected to the respective parallel ducts 57 and 58, connected to common duct 56. The venturi pump units are connected upstream of the constant displacement pump 36 which may be a gear type, as shown in FIGURE 2. The pump discharge is to duct 37. Duct 37 is connected to a metering valve 39 which as shown senses engine speed. This valve includes a shaft 41 connected to and driven off the main engine shaft. A centrifugal governor 40 is also mounted on shaft 41. The degree of opening and closing of the metering valve 39 is controlled by the centrifugal governor 40. Only a speed sensing function is shown by valve 39. However, in systems of this type additional engine operating parameters are integrated with the speed sensing valve 39, such as the "TIT" and "CDP" parameters, the former being the Turbine Inlet Temperature, hence the "TIT," and the second valve being the Compressor Discharge Pressure. All of the metering valves may be connected in series or the parameters collectively employed to control one metering valve. Duct 42 is connected directly to the lubricating oil-fuel heat exchanger 27 and then to the jet nozzles, such as nozzles 43, 44 and 45 through a duct 54. The fuel injector nozzles 43, 44 and 45 are located in the combustion chambers of the engine. Ducts 37 and 42 are also connected to ducts 47 and 46 which, in turn, are connected to a constant pressure differential valve 48. Valve 48 may be any of several types, a sliding spool type 49 is shown in the figure. This valve is connected across the metering valve 39. Valve 48, as shown, includes a longitudinal passage within which reciprocates a sliding spool member 49 normally biased to the left by a compression spring 51. A sliding piston element 50 is mounted in a cylinder 60 and cylinder 60 is connected to duct 47 through a duct 61. Piston 49a is also mounted in a cylinder 62 and this cylinder is connected to duct 46. Accordingly, the degree of closing and opening of the differential valve 48 is controlled by the difference between the pressure in the ducts 46 and 47. Valve 48, therefore, acts to maintain the desired constant differential pressure across the metering valve 38. The circular gap 52 in valve 48 is reduced by movement of spool 49 to the left. The closing of the valve is accomplished when the difference between the pressures in ducts 51 and 47 is made such that spring 46 can push spool 49 to the left, thus shutting off or diminishing area 52. Valve 48 opens wider when the pressure in duct 46 decreases and the pressure in duct 47 increases. As will be explained later, it is desirable to maintain constant pressure across the metering valve.

Duct 47 is also connected to a high pressure relief valve 64 which is connected in series with duct 59. Duct 59 is connected between duct 16, upstream of the venturi pump units 30 and 31, and duct 47. It is used as an optional safety feature to limit the maximum pressure in the entire system to protect pump 36 and engine fuel control elements in the event of some accidental malfunctioning of the system, and particularly of the metering valves.

The disclosed fuel supply system also includes a duct 63, which connects the drive shaft seal cavity of pump 36 to duct 66, thus venting this seal to the lowest pressure available. This connection of the shaft seal to a zone of reduced or minimum pressure eases the shaft seal problem on the positive displacement pump, thereby improving the overall reliability of the fuel system in spite of the increased pressures generated at the inlet to pump 36 by the action of the venturi pump units 30 and 31.

Duct 67 connected to duct 65, incorporates a check valve 68 and is connected in shunt, or in parallel, with the venturi pump units 30 and 31. The shunting duct 67 and check valve 68 permit unidirectional fluid flow from duct 16 directly into pump 36. The action is to by-pass the venturi pump units when they are inoperative due to high engine fuel consumption, i.e. the check valve becomes wide open and then duct 67 supplies a low resistance flow path to the inlet of pump 36. The by-pass line 67 and its check valve 68 are not essential to the basic operation of the system.

The number of the venturi pumps used in the system may be determined by such diverse considerations as cost, performance, weight and space. Special configurations of the venturi pump units in a mono block or cluster may have desirable features for some applications. The nozzles 34 and 35 need not necessarily be of one opening, but could be of a shower head arrangement, i.e. multiple outlet nozzles, the total effective flow area of which is equal to that required. This feature is sometimes of advantage in reducing the mixing lengths of the venturi units.

The operation of the system disclosed in FIGURE 2 is as follows: the booster pump 12 in FIGURE 1 is a pump delivering a supply of pressurized fuel to the engine bay. This pressurized fuel reaches duct 66 where it passes through the venturi pump units 30 and 31 to the main engine pump 36 and then to the fuel controller 38. The pressure across this valve is maintained constant by means of the constant pressure differential valve 48. The reason for this constant pressure differential valve may be seen from the orifice flow equation, $$Q = K\ A_1 \sqrt{\frac{\Delta P}{P}} \qquad (2)$$

where:

$Q$ = Orifice flow rate
$K$ = Constant of proportionality
$A_1$ = Effective flow over
$\Delta_P$ = Orifice pressure differential
$P$ = Fluid density The instantaneous fuel flow volume, $Q$, is therefore proportional to the instantaneous flow area, $A_1$, i.e. the circular strip of area 52 in the metering valve if the $\Delta P$ across the valve is constant. It is reasonable to assume here that the fuel density is essentially constant. Therefore, the action of the constant pressure differential valve is to maintain $\Delta P$ constant in the above equation which causes fuel flow to be only a linear function of the valve area $A_1$ as follows:

$$Q = f \times A_1$$

The constant pressure differential valves such as valve 48, and their functioning in fuel systems of this type, are known and, therefore, need no additional description. The fixed displacement pump 36 is connected directly to the engine. Accordingly, it follows that the volume output of the mechanically connected constant displacement pump is also relatively fixed, and essentially independent of the pump discharge pressure.

When fuel consumption is low, excess fuel delivered by the constant displacement pump 36 cannot find its way to the fuel nozzles 43, 44 and 45 because at this time the degree of fuel flow to the metering valve 38 is determined by the magnitude of the circular area 70. The smaller is this area, the smaller is the amount of fuel reaching nozzles 43, 44, and 45. Assuming that this area has reached some equilibrium control position, excess fuel delivered by pump 36 would to create an increase of pressure in duct 37 which, in turn, will be transmitted to duct 61, cylinder 60 and piston 50. Any tendency of the pressure to increase in cylinder 60, will result in increased opening of the differential valve 48 and the concomitant increase in available flow area 52. Accordingly, a larger amount of fuel will be by-passed through ducts 47 and 56, 57 and 58 to the venturi pumps 30 and 31 where the pressure potential energy of this excess fuel will be converted into kinetic energy for increasing the fuel pressure on the input side of pump 36 and duct 65. This, in turn, will decrease the amount of work performed by pump 36 since the head across this pump will be diminished to the extent of the head gain across venturi pumps 30 and 31. However, the most important pressure change is that across orifice 52 in valve 48. Duct 56, leading to the jets 34 and 35 of the venturi pumps, now is at high pressure, and, therefore, the pressure across orifice 52 is much lower than in the prior art systems which have no venturi pumps. Therefore, there will be only a limited amount of heating due to throttling because such throttling is done at low pressure. The amount of heating is even smaller when the venturi pumps are variable opening pumps. The same is also true when valve 48 is replaced with the minimum pressure drop valves of the type used in FIG. 4 which will be described later. In this manner, heating of the fuel is reduced to the extent indicated in Table 1.

When the engine fuel consumption is high, very little fuel heating occurs due to little or no recirculation around the fixed displacement pump; and when the engine fuel consumption is low, the recirculation flow in duct 56 to the venturi pump units is high. However, the pressure energy of the fuel in duct 37 is converted into the potential energy in duct 65, rather than heat, by usefully pressurizing the fluid at the inlet of the fixed displacement pump, thus preventing fuel heating. At all intermediate flow ratios fuel heating is likewise substantially reduced, as indicated in Table 1.

To improve performance of the fixed area venturi pump units, it is desirable to convert as much pressure energy as possible in duct 37 to the nozzles of the venturi pumps in order to make the energy transformation and transfer from duct 37 to duct 65 as efficient as possible. The more efficient is this transfer the less heat is created in the system. This means that all upstream pressure losses should be minimized. Toward this end, FIGURES 3A and 3B indicate two alternative versions of construction for valve 48. These valves contain a diffuser section 90 designed to recover pressure of the flow across the constant pressure differential valve.

FIGURE 3A illustrates a transverse section of a low pressure drop version of a constant differential pressure valve. The valve is mounted in a housing 88 and is connected between ducts 47 and 56 similarly numbered in FIGURE 2. Duct 47, 46 connects valve 88 to the by-pass fuel flow from the constant displacement pump 36, and duct 56 connects the valve to the nozzles of the jet pumps. A cylinder-piston combination 85—84 is mounted within the central portion of housing 88. This cylinder 85 is connected to housing 88 by means of one or two radial ribs 87. Piston 84 forms a lapped slide seal within cylinder 85 and piston 84 is provided with a pintle 89 connected to the piston through a stem 91. Cylinder 85 also includes a coil spring 81, a spring flange 82 and a set screw 83 for adjusting the tension of the spring. Cylinder 85 is also provided with a duct, 46 and then to duct, or port, 80. Duct 80 is connected to duct 42 in FIGURE 2 and performs the same function as duct 46 in FIGURE 2: it conveys to the inner chamber of cylinder 85 the pressure of the fuel on the downstream side of valve 38 in FIGURE 2. The valve is also provided with an expansion nozzle including the throat portion 93 and a diffuser 90. Because of the stream-lined nature of the flow, the flow losses through valve 88 will be much lower than the losses encountered in valve 48 of FIGURE 2. The position of pintle 89 and the degree of opening of valve 88 is determined by the pressures of the fuel, or fluid, in the ducts 47 and 42.

Another version of a needle valve is illustrated in FIGURE 3B. It includes a housing 99 having two input ducts 98 and 96 connected to the ducts 47 and 46 in FIGURE 2, a diaphragm 102, a pintle 103, a stem 106, a diffuser nozzle 104, a guide stem 101, a guide cylinder 100 with a vent 105 and a biasing spring 95. The functioning of this valve is the same as that illustrated in FIGURE 3A.

Figure 4A:
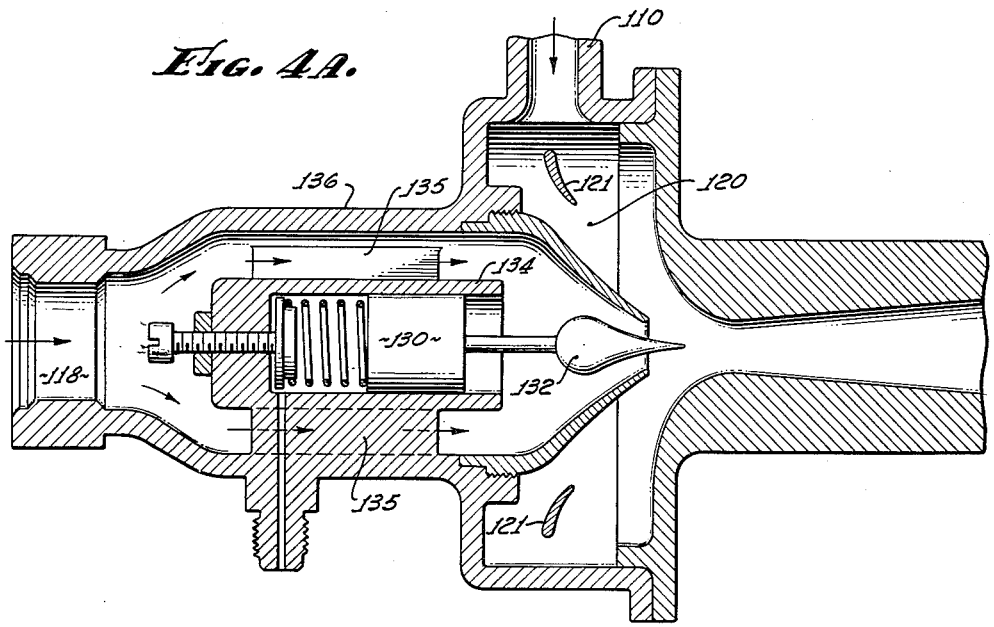
FIGURE 4A is a cross-sectional view of a variable area venturi pump of a lapped slide-body design. Two of the illustrated venturi units are shown in diagrammatic form on FIGURE 4.

Referring to FIGURE 4, a schematic diagram of an alternative fuel system is shown incorporating the features disclosed in FIGURE 2 and utilizing variable area venturi pump units. Fuel is supplied from the aircraft by duct 16 which is connected to duct 110 and then to venturi pump units 115 and 116. Variable area venturi pump units 115 and 116 are connected in series with respect to each other; while two units are shown, one or more units could be so connected, depending upon the operating requirements. The discharge side of the first varibale area venturi unit 115 is connected to duct 69 which, in turn, is connected to the input side of variable area venturi unit 116. The operation of the variable area venturi units will be described later in connection with the description of FIGURE 4A. The venturi pump units are connected in series and upstream of the rotary positive displacement pump. The discharge from the positive displacement pump 36 is connected in series with duct 37. Duct 37 is connected to the metering valve 38 which is identical to the similarly numbered valve in FIGURE 2. The operation of the fuel controller has been described previously. Duct 42 is connected to the discharge side of the metering valve. A heat exchanger 27 is connected in series with duct 42. The low temperature side of the exchanger is connected in series with duct 42, and the high temperature side is connected in series with the lubricating oil system, not illustrated. Fuel, after passing through the heat exchanger, and after being heated by the lubricating oil, discharges into duct 54 and then to the injector nozzles 43, 44 and 45. As mentioned previously, the fuel injector nozzles are located in the combustion chamber of the engine. Ducts 37 and 42 are also connected to ducts 47 and 46, respectively. Duct 46 serves to convey the metered outlet fuel pressure to the pressure sensing line 117 on each of the variable area venturi pump units. Duct 47 connects the pump discharge duct 37 to the excess fuel chamber 118 on each of the variable area venturi pump units.

Duct 47 is also connected to a high pressure relief valve 64 which is connected in series with duct 59. Duct 59 interconnects ducts 16 and 47 and performs the same function as the similarly numbered duct and check valve 64, illustrated in FIG. 1. The relief valve 64 is used as an optional safety feature to limit the maximum pressure in the entire system and to protect pump 36. Duct 63 connects the pump shaft seal cavity of the positive displacement pump 36 to duct 16.

Duct 65, immediately upstream of the positive displacement pump 36, is also connected to bypass shunt duct 67 which includes a check valve 68. The operation of this duct and its check valve has been described previously.

The operation of the variable area venturi pump units may be seen by reference to FIGURE 4A. The unit shown in FIGURE 4A is identical in function to the variable area venturi units 115 and 116 in FIGURE 4, except that suitable adjustment of the critical flow areas will be made in the individual units to accommodate the different operating conditions as a function or functions of the primary and secondary flow rates and ratios. The individual variable area venturi pump units have a housing 136. Centrally mounted within housing 136 in a cylinder 134 and a piston 130. Cylinder 134 is supported by one or two radial ribs 135.

As in FIGURE 3A, the central portion of the variable area venturi pump shown in FIGURE 4A is identical to the differential valve 88 in FIGURE 3A and, therefore, needs no additional description. The difference between what is shown in FIGURE 3A and FIGURE 4A resides in the fact that in FIGURE 4A a chamber 120 is provided which is connected to duct 16 at pump 115. The same chamber is connected to duct 69 at pump 116. Therefore, these connections of FIGURES 4 and 4A are identical with those of FIGURE 2. Chamber 120 may also incorporate fluid turning vanes 121 to reduce turning losses and pressure drop. The only other difference between FIGS. 4 and 2 is that while in FIGURE 2 duct 46 and the fluid pressure in duct 46 is used for varying the degree of opening of the differential valve 48, while, in FIGURE 4 this metered fuel pressure signal is used for controlling the positions of the pintles 132 and 132a in the variable orifice opening venturi pumps 115 and 116, and, therefore, the venturi pumps also act as a differential valve; therefore, valve 48 in FIGURE 4 is eliminated altogether. The advantage of eliminating valve 48 resides in the fact that it is a throttling valve and therefore the energy lost in this valve in FIGURE 2 is converted into heat. In order to eliminate this heating, the fixed nozzle venturi pumps 30 and 31 of FIGURE 2 are replaced with the variable nozzle venturi pumps 115 and 116 of FIGURE 4. The amount of fuel heating, therefore, will be least in FIGURE 4. The operation of the system disclosed in FIG. 4 in all other respects is identical to that of FIG. 2 and, therefore, needs no additional description.

The disclosed systems divert the entire excess of the fluid supplied by the main pump 36 to the venturi pumps where the energies contained in this excess flow are converted into pressure of the fluid on the input side of the pump. This energy transfer is obtained with a minimum amount of fuel heating since the venturi pumps have much lower losses than the throttling valve of the spool type, or of the poppet type.

What I claim as new is:

1. A fuel system for a high Mach number jet aircraft, said system including a fuel input duct connecting a source of fuel to a jet engine of said aircraft, said fuel input duct having at least one venturi pump connected in series with and between the input and the output ends of said duct, said venturi pump having a jet nozzle, a constant displacement pump having an intake side and a discharge side, said constant displacement pump having a greater capacity than the maximum fuel demand of said jet engine, said intake side being connected to the output side of said venturi pump through the output end of said fuel input duct, at least one metering valve connected to the discharge side of said constant displacement pump, combustion chamber nozzle means connected to the output side of said metering valve, a differential pressure control valve, duct means connecting said control valve across said metering valve, and duct means connecting the output side of said differential pressure control valve to said jet nozzle, said control valve diverting all of the excess fuel, the flow of which to the engine is blocked by the metering valve, to said venturi pump nozzle for transferring the potential and the kinetic energy of the unconsumed fuel to the potential energy of the fuel on the input side of said constant displacement pump, solely with the aid of said venturi pump.

2. The fuel system as defined in claim 1 which includes a by-pass duct connected across and shunting said venturi pump, and a check valve connected in series with said by-pass duct for permitting fuel from said source to flow directly to the input side of said direct displacement pump when said metering valve reaches a predetermined opening, said by-pass duct acting as a direct low resistance path from said source to said direct displacement pump for said flow.

3. The fuel system as defined in claim 1 which also includes a safety by-pass duct connected in shunt with said constant displacement pump and said venturi pump and a check valve in series with said safety by-pass duct permitting flow of said fluid from the output side of said constant displacement pump back to said source when pressure of said fluid reaches a predetermined maximum pressure which is above the normal operating range of pressure of said system on the output side of said constant displacement pump.

4. The fuel system as defined in claim 1 in which said differential pressure valve is a spring-biassed shuttle valve having first and second cylinders and first and second pistons within respective cylinders, first and second central chambers, said first chamber being hydraulically connected to the input side of said metering valve, and said second chamber being connected to said duct means leading to said jet nozzle of said venturi pump, said second piston acting as a variable opening area valve between said first and second chambers, first duct hydraulically connecting said first cylinder and said first piston to the fuel on the input side of said metering valve for counteracting the valve-closing action of said spring and the pressure of the fuel on the second piston, and a second duct hydraulically connecting said second piston and said second cylinder to the fuel on the output side of said metering valve, whereby the degree of opening and closing of said valve is controlled by the difference between fuel pressures on the input and output sides of said metering valve.

5. The fuel system as defined in claim 1 in which said differential pressure valve is a spring-biassed pintle valve having a pintle and an orifice for said pintle, said pintle valve being connected in series with said duct means, a piston, a cylinder for said piston, one side of said piston being acted upon by the pressure of the fuel in said duct means, a biassing spring tending to close said pintle against said orifice by pressing on the other side of said piston, said one end of said piston being connected to said pintle, and an additional pressure signal duct hydraulically connecting said cylinder and the other side of said piston to the output side of said metering valve, whereby the degree of opening and closing of said valve is a function of the differential pressure across said metering valve.

6. The fuel system as defined in claim 1 in which said differential pressure valve includes an orifice, a diffuser following on the downstream side said orifice, a pintle for varying the closing and opening of said orifice, and fluid-dynamically operated mechanical means for varying the degree of opening and closing of said differential pressure valve as a function of the differential pressure across said metering valve.

7. A variable load fluid supply system having a series circuit including a source of fluid, at least one venturi pump, a constant displacement pump, a fluid controller and a fluid consumer; said venturi pump having a low pressure chamber, a high pressure chamber, a nozzle connecting said high pressure chamber to said low pressure chamber, and means for closing and opening said nozzle; a differential pressure valve, a first duct connecting the downstream side of said constant displacement pump to said high pressure chamber though said differential pressure valve, a second duct connecting the downstream side of said controller to said differential pressure valve for operating said valve in response to the differential pressure existing across said controller when said system is in operation, said differential valve continuously diverting all of the excess fluid through said first duct to said high pressure chamber, said excess fluid being the fluid not reaching said consumer because of partial or total closing of said controller, and a third duct connecting said means to the downstream side of said controller for regulating the degree of opening of said nozzle in response to the pressure on the downstream side of said controller.

8. The system as defined in claim 7 in which said venturi pump includes an orifice, a diffuser on the downstream side of said orifice, a chamber upstream of said orifice for receiving fluid from said source, said chamber being positioned between said orifice and said nozzle means, said nozzle means being a variable opening nozzle means including its orifice and a pintle for regulating the degree of opening of said nozzle orifice, a piston-cylinder combination for operating said pintle, said pintle being mechanically connected to said piston, one side of said piston being exposed to the pressure of the fluid reaching said venturi pump from said constant displacement pump, and a pressure signal duct fluid-dynamically interconnecting the output, or the downstream, side of said metering valve with said cylinder and the other side of said piston, whereby said piston is responsive to and is operated by the differential pressure existing between the input and output sides of said metering valve, said variable opening nozzle thus constituting said differential pressure valve of the system.

9. The system as defined in claim 7 which also includes first and second by-pass ducts and first and second check valves in the respective by-pass ducts, said first duct being connected in shunt with said venturi pump for by-passing said venturi pump at high rate of flow of said fluid to said consumer due to the opening of said first check valve, said first duct offering a low resistance flow path from said source of fluid directly to said constant displacement pump during said high rate of flow; and said second duct being connected in shunt with said constant displacement pump and said venturi pump, said second check valve being oriented so as to open only when the pressure on the output side of said constant displacement pump reaches a pressure which is higher than the maximum rated pressure of the system, whereby said second duct and check valve act as a safety device for said system.

10. The system as recited in claim 7 which also includes a seal for said constant displacement pump, and a vent duct connecting the low pressure side of said seal to said source.

11. A fuel system having a series circuit including a source of fuel, a variable nozzle opening venturi pump, a constant displacement pump, a fuel flow controller, a heat exchanger and fuel nozzles in a combustion chamber, said system also having a continuous, open shunt duct connecting the downstream side of said constant displacement pump directly with said variable nozzle of said venturi pump, and means for controlling the degree of opening and closing of said nozzle, said means being fluid-dynamically connected on one side to the fuel supplied to said nozzle by said open duct and on the other side to the fuel on the downstream side of said controller, said means being controlled by the differential pressure of the fuel existing across said controller, and said open duct continuously delivering all of the excess fuel supplied by said constant displacement duct to said variable nozzle, and said variable nozzle supplying all of said excess fuel to the upstream side of said constant displacement pump.

References Cited in the file of this patent

UNITED STATES PATENTS

| | | |
|---|---|---|
| 1,350,095 | Eddison | Aug. 17, 1920 |
| 1,421,841 | Schmidt | July 4, 1922 |
| 2,056,994 | Woods | Oct. 13, 1936 |
| 2,457,388 | Lung | Dec. 28, 1948 |
| 2,575,923 | McMahan et al. | Nov. 20, 1951 |
| 2,594,689 | Sharp et al. | Apr. 29, 1952 |
| 2,812,715 | Redding et al. | Nov. 12, 1957 |
| 2,823,518 | Murray | Feb. 18, 1958 |